(12) United States Patent
Pinyayev

(10) Patent No.: US 6,733,709 B2
(45) Date of Patent: May 11, 2004

(54) METHODS AND APPARATUS FOR PRODUCING GRANULAR COMPOSITIONS

(75) Inventor: Aleksey Mikhailovich Pinyayev, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 337 days.

(21) Appl. No.: 09/923,009

(22) Filed: Aug. 3, 2001

(65) Prior Publication Data

US 2002/0045561 A1 Apr. 18, 2002

Related U.S. Application Data

(60) Provisional application No. 60/222,553, filed on Aug. 3, 2000.

(51) Int. Cl.[7] .................................................. B29B 9/06
(52) U.S. Cl. ........................ 264/143; 264/141; 425/308
(58) Field of Search ............................ 264/11, 12, 140, 264/141, 142, 143; 425/7, 72.2, 308

(56) References Cited

U.S. PATENT DOCUMENTS

| | | |
|---|---|---|
| 4,776,998 A | 10/1988 | Davidson et al. |
| 5,290,496 A | 3/1994 | Carduck et al. |
| 5,435,945 A | 7/1995 | DePaoli et al. |
| 5,628,937 A | 5/1997 | Oliver et al. |
| 5,843,347 A | 12/1998 | Nguyen et al. |

FOREIGN PATENT DOCUMENTS

| | | |
|---|---|---|
| DE | 2725924 A1 | 12/1978 |
| DE | 3832006 A | 9/1988 |
| DE | 4007601 A1 | 3/1990 |
| DE | 3926253 A1 | 2/1991 |
| DE | 4321771 A1 | 6/1993 |
| EP | 0 075 609 A1 | 4/1983 |
| EP | 0 204 596 A1 | 12/1986 |
| EP | 0 328 880 A | 1/1988 |
| EP | 0 830 927 A2 | 9/1997 |
| GB | 638564 | 6/1950 |
| JP | 10235639 A | 9/1998 |
| WO | WO 91/15567 A | 4/1990 |
| WO | WO 91/02047 | 2/1991 |

*Primary Examiner*—Mary Lynn Theisen
(74) *Attorney, Agent, or Firm*—Brian M. Bolam; Brahm J. Corstanje; Kim William Zerby

(57) ABSTRACT

Methods for producing granular compositions comprise the steps of preparing a viscous liquid mixture, forming a plurality of ligaments from the viscous liquid mixture, cutting the ligaments with one or more liquid jet streams to form pieces, and drying the pieces to form the granular compositions. Apparatus for producing a granular compositions comprise a viscous liquid composition supply, a ligament forming device in fluid communication with a viscous liquid composition supply, one or more liquid jet nozzles adjacent an outlet of a ligament forming device, and a dryer.

18 Claims, 3 Drawing Sheets

```
┌─────────────────────────┐
│     Preparing a         │─── 50
│  viscous liquid mixture │
└─────────────────────────┘
            │
            ▼
┌─────────────────────────┐
│    Providing a  P       │─── 54
│  on the viscous liquid  │
│  composition across on  │
│      orifice plate      │
└─────────────────────────┘
            │
            ▼
┌─────────────────────────────────┐
│     Cutting the ligaments       │─── 58
│ with the liquid jets to form droplets │
└─────────────────────────────────┘
            │
            ▼
┌─────────────────────────┐
│ Drying the droplets in a│─── 62
│ drying tower with a gas │
│          flow           │
└─────────────────────────┘
```

Fig. 1

METHODS AND APPARATUS FOR PRODUCING GRANULAR COMPOSITIONS

CROSS REFERENCE TO RELATED APPLICATIONS

This application claims priority under 37 U.S.C. §119(e) to U. S. Provisional Application Ser. No. 60/222,553, filed Aug. 3, 2000.

FIELD OF THE INVENTION

The present invention relates to methods and apparatus for producing uniform granular compositions, and more particularly to methods and apparatus which may be used for producing of uniform granular detergent compositions.

BACKGROUND OF THE INVENTION

One of the most widespread ways of manufacturing detergent granules is through a spray drying process. A detergent mixture is sprayed through an atomization nozzle and the resulting droplets are dried in a gas flow in a drying tower. Spraying is usually done through pressure or swirl nozzles. The detergent product obtained by these technologies typically contains particles which widely vary in size. For example, for a swirl atomizer with counterflow drying air, typical particle sizes range from about 100 microns to about 1100 microns, resulting in non-uniform particles or granules.

The difficulty in producing uniform droplets and resulting granules is a well-known problem for conventional atomization technology. Certain atomization methods are known for minimizing this problem. Among them are ultra-sonic, electrostatic, and acoustic atomization techniques. However, none of these techniques are applicable for making detergent granules having a large particle size (i.e. of at least 500 microns). Detergent slurry is typically a highly viscous, non-Newtonian, water-based mixture containing approximately 70% solids. In addition, detergent slurry is typically conductive and corrosive (pH>12). Because of the detergent slurry's typical high viscosity and high solids content, the slurry cannot be properly processed by conventional ultra-sonic atomizers. In addition, the detergent slurry usually cannot be processed by electrostatic atomizers due to the conductivity and viscosity of the detergent slurry. Furthermore, acoustic atomization is typically not possible because the slurry efficiently attenuates the sound waves necessary for such processes.

To meet commercial manufacturing demands, it is typically desired that any atomization method applied to a detergent slurry have a throughput capacity of about 50–60 tons per hour. However, typically atomization technologies are viewed as low-throughput methods and none of the prior known atomization methods are able to process such amounts of slurry in one unit. Accordingly, multiple atomization units would be required to provide the desired throughput capacity. The use of multiple units however requires additional capital expenditures. As such, there remains a need for an efficient process for the preparation of uniform granular compositions, such as detergent compositions, with a relativity high throughput.

SUMMARY OF THE INVENTION

Accordingly, it is an object of the present invention to provide novel methods and apparatus for the preparation of uniform granular compositions, which methods and apparatus overcome one or more disadvantages of the prior art. It is a more specific object of the invention to provide methods and apparatus for producing of uniform granular detergent compositions. Another object of the present invention is to provide methods and apparatus having high throughput for the production of uniform granular detergent compositions.

These and additional objects and advantages are provided by methods and apparatus for manufacturing granular compositions according to the invention.

One embodiment of the present invention relates to methods for producing granular compositions. The methods comprise the steps of preparing a viscous liquid mixture, forming a plurality of ligaments from the viscous liquid mixture, cutting the ligaments with one or more liquid jet streams to form pieces, and drying the pieces to form the granular composition.

Another embodiment of the present invention relates to apparatus for producing granular compositions. The apparatus comprise a viscous liquid composition supply, a ligament forming device in fluid communication with the viscous liquid composition supply, one or more liquid jet nozzles adjacent an outlet of the ligament forming device, and a dryer. The methods and apparatus of the present invention are advantageous in providing uniform granular compositions at a relatively high throughput if desired. These and additional objects and advantages will be further apparent in view of the following detailed description.

BRIEF DESCRIPTION OF THE DRAWINGS

The present invention as set forth in the detailed description will be more fully understood when viewed in connection with the drawings in which:

FIG. 1 depicts a flowchart of a method for producing a granular composition according to the present invention;

DETAILED DESCRIPTION

Figure 2:
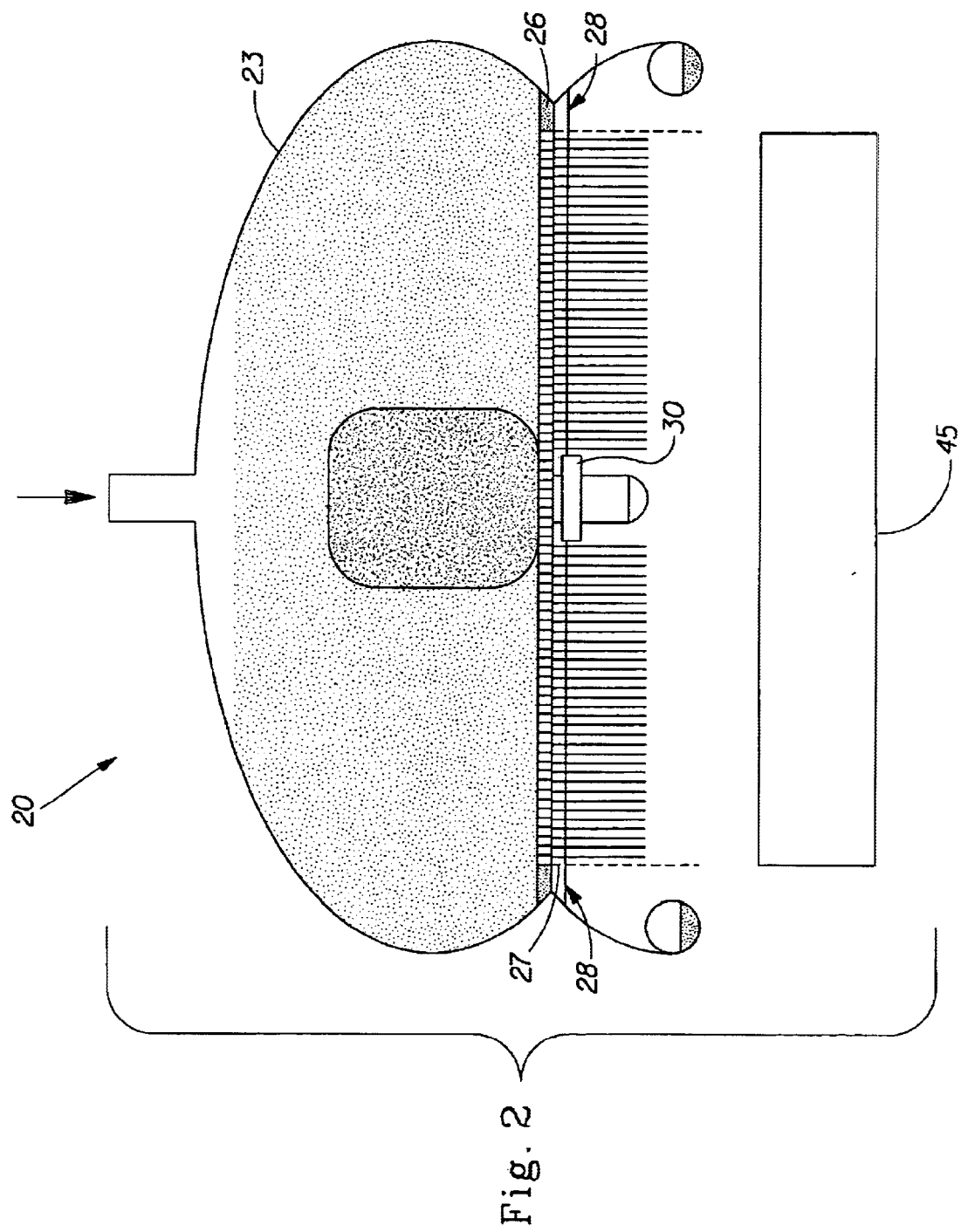
FIG. 2 depicts a schematic illustration of an apparatus according to the present invention.

In the methods of the present invention for producing granular compositions having a uniform size, fluid cutting technology as described herein is utilized. The fluid cutting technology comprises cutting multiple ligaments of a liquid moving at a relatively low rate, by means of a stream having high energy which is concentrated in space and moving in a direction different than the direction of the liquid being atomized. High speed water jets and laser beams are examples of such high energy streams that can be utilized.

One aspect of the present invention is a method for producing a granular composition comprising the steps of providing a viscous liquid mixture, forming a plurality of ligaments from the viscous liquid mixture, cutting the ligaments with one or more liquid jet streams to form pieces, and drying the pieces to form the granular composition. In one embodiment, the step of forming a plurality of ligaments from the viscous liquid mixture comprises extruding the viscous liquid mixture through an orifice plate. The orifice plate preferably has multiple orifices. These orifices preferably divide a bulk volume of the viscous liquid mixture, for example a slurry, into multiple ligaments extruded through the orifice plate under the combined action of pressure and gravity. The resulting ligaments are preferably free hanging. These free hanging ligaments are then cut by one or more, preferably multiple, jets of liquid. The jets of liquid may be formed by a rotating head, wherein the liquid is supplied under high pressure, although other apparatus for forming liquid jets will be apparent to one skilled in the art after reading the present disclosure. Preferred liquids include water. Optionally, the liquid, for example water, may be modified with a polymeric binder or the like to enhance the cohesiveness of the liquid stream.

In an embodiment of the present invention depicted in FIG. 1, the method of producing a granular composition comprises the steps of preparing a viscous liquid mixture (step 50), and providing a pressure differential on the viscous liquid composition (step 54) across an orifice plate resulting in a pre-determined flow rate of the viscous liquid composition through the orifice plate to create a plurality of ligaments. The ligaments are then cut (step 58) with one or more liquid jet streams to form pieces having a pre-determined particle size. The pieces are then dried in a drying tower with a gas flow (step 62). Preferably, the ligaments are cut with liquid jets supplied from a rotary head comprising a predetermined number of individual jets having a predetermined rotational speed. The particle size of the pieces is proportional to the flow rate of the viscous liquid composition and inversely proportional to the number of individual jets and their rotational speed.

In one embodiment, the viscous liquid mixture comprises a slurry, while in another embodiment the viscous liquid mixture comprises a paste. By "slurry," the Applicant means a complex, non-uniform composition of liquids and solids. By "paste," the Applicant means a more uniform composition of liquids and solids. In another embodiment, the viscous liquid composition comprises at least from about 20 to about 80 weight percent solids, and more preferably from about 55 to about 70 weight percent solids. In a specific embodiment, the viscous liquid composition is employed to form granular detergent compositions and comprises one or more of the following components: surfactant selected from anionic, nonanionic, cationic, amphoteric and zwitterionic detergent-active components and mixtures thereof; detergency builder, bleaching agents, suds suppression agents, enzymes, polymer dye transfer inhibiting agents, corrosion inhibitor, heavy metal ion sequestrant, softening agents, calcium, magnesium, solvent, perfumes, colors and filler salts.

Figure 3:
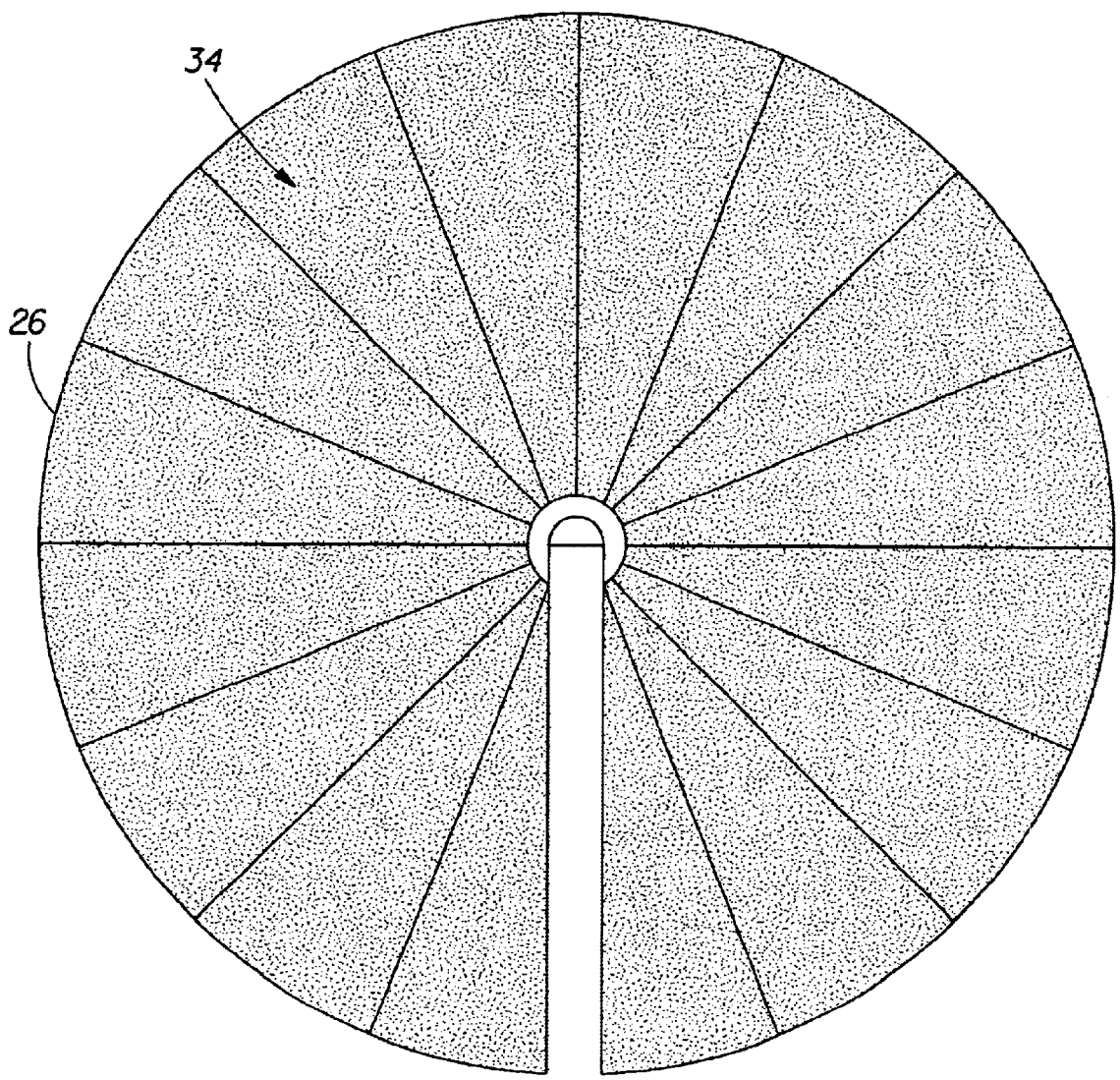
FIG. 3 depicts a schematic illustration of an exemplary orifice plate included in an embodiment of an apparatus according to the present invention.

Another aspect of the present invention, depicted in FIG. 2, is an apparatus 20 for producing a granular composition. The apparatus 20 comprises a viscous liquid composition supply 23, a ligament forming device 26 in fluid communication with the viscous liquid composition supply 23, one or more liquid jet nozzles 28 adjacent an outlet 27 on the ligament forming device 26, multiple liquid jets, and in one embodiment comprises a dryer 45. Preferably, the apparatus 20 comprises from about 1 to about 128 individual liquid jet nozzles 28 provided on a rotary head 30. Each liquid jet nozzle 28 preferably has a diameter of a size sufficient to provide the desired liquid jet, and preferably has a diameter of from about 0.002 inch to about 0.2 inch. Preferably, the ligament forming device 26 comprises an orifice plate. FIG. 3 depicts an exemplary orifice plate for inclusion in an apparatus of the present invention. The orifice plate typically has a diameter range of from about 3 inches to about 50 inches. The orifice plate 26 has one or more holes 34, having a diameter sufficient to form the desired size of granules, and in one embodiment have a diameter of from about 0.001 inch to about 0.1 inch, and more preferably, a diameter of from about 0.01 inch to about 0.05 inch, and preferably, a diameter of from about 0.0125 inch to about 0.02 inch. The dryer 45 preferably comprises one or more gas streams, wherein at least one gas stream preferably flows counter current to the pieces. The viscous liquid composition is extruded at a flow rate based on the desired dried particle size and the number of water jets and their rotational speed.

Preferably, the liquid jet nozzles have a diameter of from about 0.002 inch to about 0.2 inch, and more preferably from about 0.002 inch to about 0.004 inch. The liquid jet nozzles expel liquid at a pressure of from about 100 psi to about 55,000 psi, more preferably at a pressure of from about 500 psi to about 20,000 psi and most preferably, the liquid jet nozzles expel liquid from about 10,000 psi to 20,000 psi.

Preferably, the rotational speed of the jet nozzles, the number of jet nozzles, the rate of the slurry's movement and the ligament's movement are kept constant so that pieces of a pre-defined volume are obtained.

In one embodiment of the present invention, the apparatus further comprises a catcher system. The catcher system is configured to catch the liquid jet and any debris from the ligament during the cutting process. As one skilled in the art will appreciate, various catcher systems can be employed in the present invention. In another embodiment, the liquid jet stream from the catcher stream can be recycled and preferably any ligament debris is recycled back into the viscous liquid supply.

In another embodiment of the present invention, the liquid jets comprise a kinetic energy which separates and distributes the pieces of the ligaments in a cross sectional plane. In one embodiment, multiple liquid jet nozzles are utilized to reduce rotational speed of the liquid jet nozzles. Preferably, the ligaments are cut with a rotary head having from about 1 to about 128 individual jet nozzles, more preferably the rotary head comprises from about 10 to about 128 individual jet nozzles, and most preferably the rotary head comprises from about 12 to about 16 individual jet nozzles.

In another embodiment of the present invention, the rotary head rotates at a speed of from about 500 RPM (revolutions per minute) to about 6000 RPM, more preferably at a speed of from about 2000 RPM to about 4000 RPM, and most preferably at a speed of from about 2500 RPM to about 3000 RPM.

In one embodiment of the present invention, the liquid jet nozzles preferably rotate on a rotary axis and the formed ligaments do not rotate. Alternatively, the liquid jet nozzles may remain stationary and ligaments may rotate on an rotary axis. In yet another embodiment, both the liquid jet nozzles and the ligaments rotate on rotary axes. The liquid jet nozzles may rotate in the same direction as that of the ligaments, or alternatively, the liquid jet nozzles may rotate in a different direction as that of the ligaments. Preferably, the nozzles rotate in a circular motion, alternatively the liquid jet nozzles may rotate in a linear motion. The circular motion of the liquid jet nozzles may be constant or reciprocated.

After cutting the ligaments, the pieces are substantially cylindrical in shape. However, due to surface tension from the gas stream and drying, the pieces become quasi-spherical in shape. While not limiting the invention, it is believed that when the pieces are dried in the hot gas flow, steam is liberated from the granule due to the heating of the granule which causes the granule to expand and promotes the shape transfer from a cylindrical shape to the quasi-spherical shape.

The fluid cutting technology of the present invention is especially applicable to forming granular compositions from high-viscosity compositions because the concentrated energy of the cutting stream (kinetic energy in case of the water jet) usually exceeds the energy required to overcome the viscosity. The water jet atomization technology efficiently atomizes non-Newtonian liquids. It is believed that a non-Newtonian liquid's velocity is reduced as the shear rate increases. Thus, the technology of the present invention allows cutting very viscous streams as a result of the high shear rate. Preferably, the shear rate at which the water jet cuts the liquid is very high (on the order of 10,000 $s^{-1}$) typically from about 10,000 $s^{-1}$ to about 150,000 $s^{-1}$ and the corresponding shear time is low.

In another embodiment of the present invention, the apparatus comprises a viscous liquid composition supply, a ligament forming device in fluid communication with the viscous liquid composition supply, one or more laser beams adjacent an outlet on the ligament forming device and a dryer. Preferably, multiple laser beams are utilized. In another embodiment, the laser beams rotate around a rotary axis.

The methods and apparatus of the invention are advantageous for producing granular compositions of uniform size and shape. In one embodiment of the present invention, the granular composition produced by the methods of the present invention has a relative span factor of less than 1.0, wherein relative span factor is $(D_{0.9}-D_{0.1})/D_{0.5}$ wherein $D_{0.9}$ is the maximum granule size (diameter), $D_{0.1}$ is the minimum granule size and $D_{0.5}$ is the average granule size.

The present invention provides the ability to produce detergent granules from detergent components having a high corrosivity (pH>12) due to the cutting tool (water jet or laser beam) having minimal contact with the detergent components. In addition, the cutting tool is not greatly influenced by the conductivity of the detergent components.

The above-described embodiments of the present invention for producing a granular composition have comprised the step of drying the pieces to form the granular composition. As will be appreciated by one skilled in the art, this step could entail any solidifying process, for example, freezing, cooling, evaporating, drying or the like. As such, another embodiment of the present invention includes a method for producing a granular composition comprising the steps of: producing a viscous liquid mixture; forming a plurality of ligaments from the viscous liquid mixture; cutting the ligaments with one or more liquid jet streams to form pieces; and solidifying the pieces to form the granular composition.

Likewise, one skilled in the art will appreciate that the dryer in the apparatus for producing a granular composition could entail any solidifying device, i.e. (freezer, dryer or the like).

The foregoing description of various embodiments of the invention has been presented for the purposes of illustration and description. It is not intended to be exhaustive or to limit the invention to the precise form disclosed. Many alternatives, modifications and variations within the scope of the invention will be apparent to those skilled in the art. Accordingly, this invention is intended to embrace all alternatives, modifications and variations that have been discussed herein and others that fall within the spirit and broad scope of the claims.

What is claimed is:

1. A method for producing a granular composition comprising the steps of:

a) providing a viscous liquid mixture;

b) forming a plurality of ligaments from the viscous liquid mixture;

c) cutting the ligaments with one or more liquid jet streams to form pieces; and d) drying the pieces to form the granular composition; wherein the liquid jet streams rotate on a rotary axis and the ligaments are stationary.

2. A method for producing a granular composition comprising the steps of:

a) providing a viscous liquid mixture;

b) forming a plurality of ligaments from the viscous liquid mixture;

c) cutting the ligaments with one or more liquid jet streams to form pieces; and d) drying the pieces to form the granular composition; wherein the liquid jet means are stationary and the ligaments rotate on a rotary axis.

3. A method for producing a granular composition comprising the steps of:

a) providing a viscous liquid mixture;

b) forming a plurality of ligaments from the viscous liquid mixture;

c) cutting the ligaments with one or more liquid jet streams to form pieces; and d) drying the pieces to form the granular composition; wherein the liquid jet steams rotate on a rotary axis and the ligaments rotate on a rotary axis.

4. The method of claim 3, wherein the liquid jet streams rotate in the same direction as the rotation tithe ligaments.

5. The method of claim 3, wherein the liquid jet streams rotate in a different direction as the rotation of the ligaments.

6. A method for producing a granular composition comprising the steps of:

a) providing a viscous liquid mixture;

b) forming a plurality of ligaments from the viscous liquid mixture;

c) cutting the ligaments with one or more liquid jet streams to form pieces; and d) drying the pieces to form the granular composition; wherein the liquid jet streams move in a circular motion.

7. The method of claim 6, wherein the circular motion is constant.

8. The method of claim 6, wherein the circular motion is reciprocated.

9. A method for producing a granular composition comprising the steps of:

a) providing a viscous liquid mixture;

b) forming a plurality of ligaments from the viscous liquid mixture;

c) cutting the ligaments with one or more liquid jet streams to form pieces; and d) drying the pieces to form the granular composition; wherein the liquid jet streams comprise a kinetic energy which separates and distributes the pieces in a cross-sectional plan.

10. A method for producing a granular composition comprising the steps of:

a) providing a viscous liquid mixture;

b) forming a plurality of ligaments from the viscous liquid mixture;

c) cutting the ligaments with one or more liquid jet streams to form pieces; and d) drying the pieces to form the granular composition; wherein the ligaments are cut with a liquid jet stream provided by a rotary head having from about 1 to about 128 individual jet nozzles.

11. The method of claim 10, wherein the rotary head comprises from about 10 to about 128 individual jet nozzles.

12. The method of claim 10, wherein the rotary head comprises from about 12 to about 16 individual jet nozzles.

13. The method of claim 10, wherein the rotary head rotates at a speed of from about 500 rpm to about 6000 rpm.

14. The method of claim 10, wherein the rotary head rotates at a speed of from about 2000 rpm to about 4000 rpm.

15. The method of claim 10, wherein the rotary head rotates at a speed of from about 2500 rpm to about 3000 rpm.

16. A method for producing a granular composition comprising the steps of:
    a) providing a viscous liquid mixture;
    b) forming a plurality of ligaments from the viscous liquid mixture;
    c) cutting the ligaments with one or more liquid jet streams to form piece; and
    d) drying the pieces to form the granular composition;
    wherein:
    the forming step comprises providing a pressure differential on the viscous liquid composition across an orifice plate resulting in a predetermined flow rate of the viscous liquid composition through the orifice plate to create the plurality of ligaments;
    the cutting step comprises cutting the ligaments with one or more liquid jet streams to form pieces having a predetermined particle size;
    the liquid jet streams are provided by a rotary head comprising a predetermined number of individual jet nozzles having a predetermined rotational speed; and
    the particle size of the pieces is proportional to the flow rate of the viscous liquid composition and inversely proportional to the number of individual jet streams and their rotational speed.

17. An apparatus for producing a granular composition comprising:
    a) viscous liquid composition supply;
    b) a ligament forming device in fluid communication with the viscous liquid composition supply;
    c) from about 1 to about 128 individual liquid jet nozzles provided on a rotary head, adjacent an outlet of the ligament forming device; and
    d) a dryer.

18. A method for producing a granular composition comprising the steps of:
    a) providing a viscous liquid mixture;
    b) forming a plurality of ligaments from the viscous mixture;
    c) cutting the ligaments with one or more liquid jet streams to form pieces; and
    d) solidifying the pieces to form the granular composition; wherein the granular composition has a relative span factor of less than 1.0, wherein relative span factor is $(D_{0.9} - D_{0.1})/D_{0.5}$ wherein $D_{0.9}$ is maximum granule size (diameter), $D_{0.1}$ is the minimum granule size and $D_{0.5}$ is the average granule size.

* * * * *